March 9, 1965   B. A. WYMAN   3,172,945
TERMINALS FOR SEALED ELECTRICAL DEVICES
Filed May 1, 1961
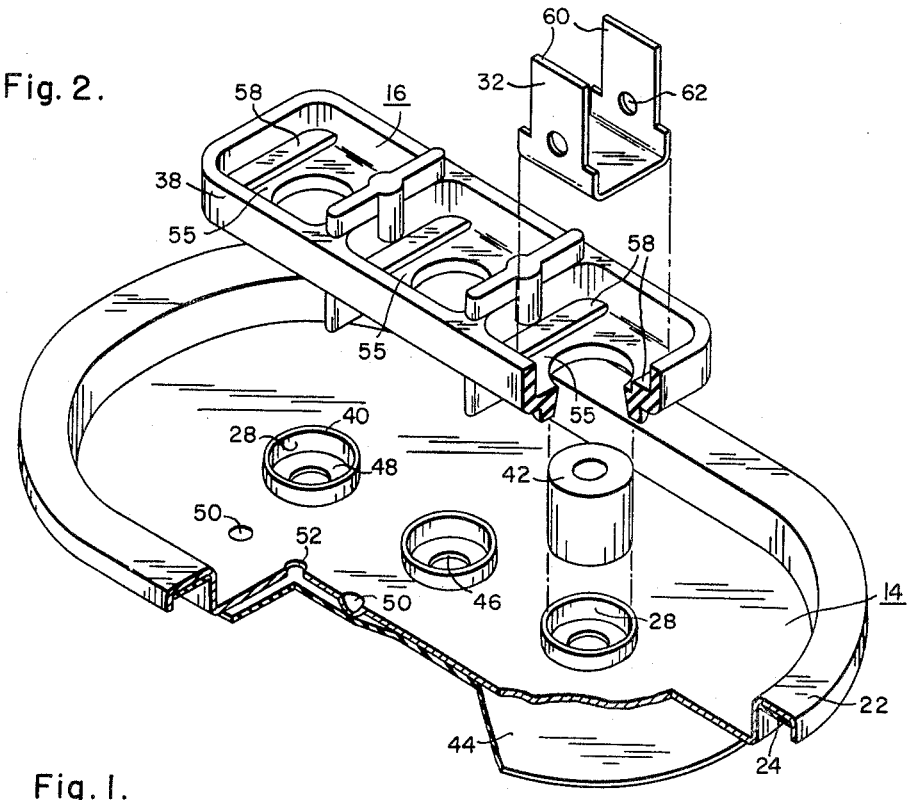
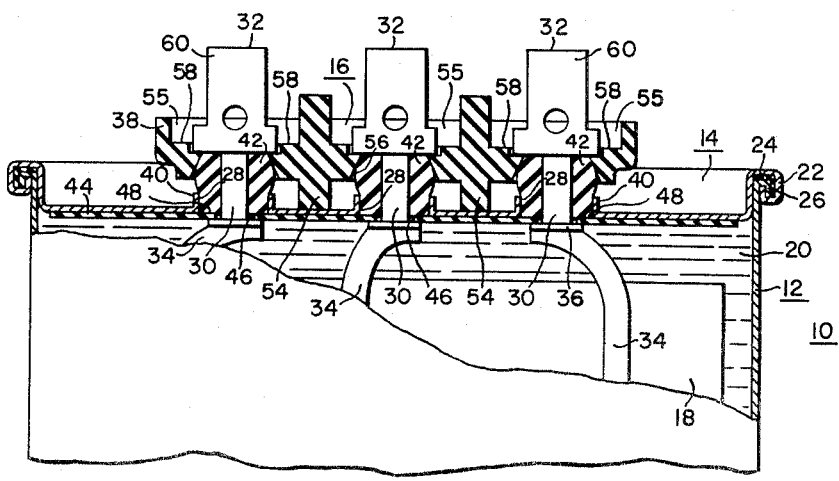
WITNESSES
INVENTOR
Burton A. Wyman
BY
ATTORNEY United States Patent Office 3,172,945
Patented Mar. 9, 1965

3,172,945
TERMINALS FOR SEALED ELECTRICAL
DEVICES
Burton A. Wyman, Cleveland, Ohio, assignor to Westinghouse Electric Corporation, East Pittsburgh, Pa., a corporation of Pennsylvania
Filed May 1, 1961, Ser. No. 106,568
6 Claims. (Cl. 174—52)

This invention relates generally to a terminal structure for encased electric devices and the like, and relates more particularly to a novel feed-through insulator and terminal assembly for ballastic and similar capacitors.

Although the insulator and terminal assembly is a relatively small part of an entire capacitive unit, it has often been the cause of failure for that unit due to the twisting of terminals and the resultant deterioration of the insulation and bushings. Bushing rupture, which often is caused by such undue terminal twisting and by undue compressive pressure, usually results in seepage of the capacitor dielectric liquid from the casing of the capacitor. This obviously shortens capacitor life and, at the least, renders the capacitor effective at less than its full rated capability. Also, the insulator terminal assembly frequently must be extended below the capacitor cover so as to take up room inside the capacitor casing, thus leaving a smaller effective area available to the capacitive elements in the casing and thereby reducing the rated capability of that capacitor. The present invention eliminates failures and inadequacies of the above-described nature, reduces equipment manufacturer's assembly time and makes future servicing easier.

Accordingly, it is an object of the present invention to provide a more efficient insulator and terminal assembly for a ballastic type capacitor.

Another object of the present invention is to provide an insulator and terminal assembly for a capacitor which increases the length of the capacitor's life, increases its rated capability, and increases its quality while decreasing its cost.

It is a further object of the present invention to provide an insulator and terminal assembly which locks the terminals against rotation and provides high mechanical rigidity therefor as required before and after attachment of leads or cables to the terminals.

Another object of the present invention is to provide a bushing arrangement for a capacitor casing which acts as an effective barrier to seal against dielectric seepage and is unlikely to rupture to effect such seepage.

It is a further object of the present invention to provide a new one-piece molded cupped insulator for containing the terminals thus providing the aforementioned increased rigidity and terminal locking advantages.

Another object of the present invention is to provide a novel insulator and terminal assembly which is usable for either two or three terminal components when one of these alternatives is desired.

Still another object of the present invention is to provide an insulator and terminal cup assembly which is spaced from the cover so as to give a predetermined compression upon the bushings to provide a better seal and prevent rupture of the bushings.

A still further object of the present invention is to provide an insulator and terminal assembly having the above-mentioned advantages and which is still substantially located entirely above the cover.

These and other objects of the invention will become more apparent upon consideration of the following detailed description of a capacitor feed-through insulator and terminal assembly incorporating various components constructed in accordance with the principles of the invention when taken in connection with the following drawings, in which:

FIGURE 1 is a partial cross-sectional view of a capacitor constructed according to the principles of the present invention; and FIG. 2 is a partial exploded isometric view of the capacitor cover and insulator and terminal assembly of FIG. 1 prior to its assembly with the capacitor casing.

The present invention relates to a novel insulator and terminal assembly for electric devices and particularly a ballastic-type capacitor, the insulator being made of an electric insulating material and having spacing legs for providing a predetermined stress upon a bushing located around an opening in the cover and under the insulator so as to effectively seal the opening without premature rupture and deterioration of the bushings. The insulator further locks the terminals in position so as to prevent any rotation thereof. Such locking is generally required to resist the torque forces that are applied to the terminals in their normal use. The assembly includes provision for the alternate use of two or three terminal components therein, whichever is more desirable for the particular situation involved. By having two or more terminals connected to a capacitor cover through a single elongated insulator, the insulator itself cannot rotate so that the locking of the terminals to the insulator and the locking of the insulator to the capacitor cover results in the terminals being locked against rotation both with respect to said insulator and the capacitor cover. This novel terminal assembly is located entirely above the top of the cover, except for a slight protrusion of the necessary electrically contacting element, so as to provide more room for the capacitive material within the capacitor casing. Thus, it is readily apparent that the rigid insulator, the terminal locking connection, the spacing of the insulator from the cover to provide proper compressive forces upon the bushings, and the locating of the assembly almost entirely above the cover eliminate failures frequently present in capacitor elements heretofore.

Referring more particularly to the drawings, it can be seen that the capacitor 10 comprises an elongated metallic casing or can 12, a metallic cover 14 covering the open top of the casing 12, and an insulator and terminal assembly 16 located on top of the cover 14 and electrically connected with the capacitive internals of the casing 12. The casing 12 contains typical capacitor plates 18 surrounded by an insulating fluid 20, such as a chlorinated bi-phenol material.

It is noted that the cover 14 contains a flanged rim 22 having a flowed on rubber like gasket 24 located on the inwardly disposed surface thereof. The flanged rim 22 is double crimped over the top edge 26 of the casing 12 forming a permanent and sealed connection therewith. It is noted that the cover 14 contains three openings or apertures 28 for entrance of the terminal stems or rivets 30 which are rigidly secured to the bottom of terminals 32 by welding or the like. In a more simple arrangement, only two of the openings 28 might be necessary for capacitor operation and thus the middle opening 28 would not be included in the cover.

However, at times it can be desirable to connect two capacitances having one common electrode in a single casing 12. In this instance, three terminals 32 are used, one trimmer terminal 32 to the common electrode 34 and one regular terminal 32 each to the other electrodes 34. At other times, the third terminal 32 can be assembled to separate capacitances 18 in a common casing. In the latter instance, one electrode 34 is connected from each of the capacitances 18 to a common terminal 32, one electrode of one capacitance to a second terminal, and one electrode of the other capacitance to a third terminal. FIGS. 1 and 2 illustrate a cover assembly adapted to receive three such terminals 32 but less than that number are included in FIG. 2 for the purpose of more clearly illustrating the construction of the capacitor 10 and its assembly 16. Each of the electrodes 34 are weldedly connected to the bottom of the terminal rivet 30, it being noted that the lower cap 36 and a small portion of the rivet 30 is the only part of the assembly 16 which extends into the interior of the casing 12. This, as previously stated, clearly allows more room within the capacitor casing for the actual capacitance components. It should be noted, that in every instance the construction of insulator portion 38, preferably made of a molded phenolic material, of the assembly 16 remains the same whether two or three terminals 32 are employed, the only difference primarily being that the center opening 28 is not formed in the cover 14 when only two such terminals 32 are employed.

A peripheral flange 40 extends around each of the openings 28 in the cover 14 so as to accurately locate the elongated resilient bushings 42 which are made of silicone rubber or the like, the bushings having a circumference only slightly smaller than that of the peripheral flange 40. Located directly beneath the cover 14 is a pressboard 44 secured to the bottom surface of the cover 14 by the caps 36 or by other comparable means. The pressboard 44 can be made of any insulating paper material desired. The pressboard 44 contains apertures 46 concentric with the openings 28 in the cover but of the smaller size so as to generally permit only the stem 30 to pass therethrough. Thus, the over-extending portion 48 whereby the pressboard 44 partially covers the opening 28 in the cover 14 provides a shoulder upon which each of bushings 42 can seat, thus limiting the bushings' downward movement within the peripheral flange 40.

Formed in the surface of the cover 14 are a pair of dimples 50 and a relatively small aperture or hole 52. The dimples 50 serve to space the pressboard 44 downwardly from the bottom surface of the cover 14, at least adjacent that side of the cover 14 where the dimples 50 are located. The hole 52 is employed to permit vacuum drying of the internals of the casing 12 and for filling of the casing with the insulating fluid 20. After the casing 12 is filled and the vacuum drying is completed, the hole 52 is filled with solder or the like. Thus, the dimples 50 are primarily to space the pressboard 44 under the cover 14 keeping it from closing the hole 52. Such use of dimples and holes to provide vacuum drying and filling of the can with insulating fluid is common and does not form a part of the present invention.

The one-piece insulator 38 is provided with spacing legs 54 to limit the amount of compression upon the bushings 42. The cupped sections 55 of the insulator 38 contain slanted apertures 56 such that the top opening thereof is smaller than the circumference of the bushing 42 while the bottom opening thereof is slightly larger than the bottom circumference of the bushing 42. Thus, when the insulator 38 is brought down flush with the top of the cover 14, each slanted aperture 56 grips a bushing 42 so as to compress it with the spacer legs 54 limiting the amount of compression that can be applied thereto. This limited compression and the fact that the bushings are no longer subject to torque twist, the latter described below, has substantially eliminated the rupturing and detoriation of the bushings 42 as was common in the past.

The terminals 32 serve to secure the insulator 38 to the cover 14. The interior of each of the sections 55 of the insulator 38 contains raised guide flanges or shoulders 58 at the periphery of each aperture 56 between opposing ones of which each terminal 32 is located. The guides 58 are spaced a distance only slightly further apart than the width of the bight portion of the main body of a terminal 32 so as to prevent turning and twisting of the terminal within each of the sections 55. The locking of the terminals in each section is most effective when the edges (length) of the bight portion of the terminal engage the guides 58, as shown, rather than when the terminals are rotated from their shown position 90° so that the projections 60 are engaged therewith. This is because the edge of the bight portion presents a sharp engagement with the guides while the projections 60 are rounded at their base and are more likely to slip out over the guides. As stated previously, the terminal 32 includes a stem or rivet-like section 30 directly therebelow and integrally formed with the bottom of the main body of the terminal. The stem 30 includes the bottom flange portion 36 for securing the terminal 32 to the cover 14. The flange 36 by pressing against the bottom of the pressboard 44 thus serves as a holding member for securing the insulator 38 and the pressboard 44 against the upper and lower surfaces of the cover member 14, respectively, and for securing the terminals 32 in place. The bushing 42 in its compressed and assembled position thus hugs against the stem 30 and abuts against the peripheral flange 40 so as to provide an effective seal, with the terminal stem 30, for the openings 28 and 46 in the cover member 14 and pressboard 44, respectively. The upper U or body part of the terminals 32 contains two mating projections 60 for receiving female connectors (not shown) and are provided with an aperture 62 for receiving a mating dimple on the female connector.

Thus, there has been disclosed an insulator and terminal assembly for electrical components such as capacitors where there is provided a feed-through bushing of high dielectric strength, high creepage between terminals and from the terminals to ground, a positive and permanent seal against leakage of the insulating fluid within the capacitor, a lock against rotation of the terminals, and high mechanical rigidity such as that required before and after attachment of leads or cables to an insulator and terminal assembly. The rigidity in the present invention depends on an elongated cup-like insulator member rather than on a silicone rubber bushing which lacks torque resistance and ruptures easily upon twisting or undue compression.

Since it is obvious that this invention can be embodied in other forms of construction within the spirit and scope of the invention, as would be apparent to one skilled in the art, it is to be understood that the particular form shown is but one of such embodiments. Accordingly, with various modifications and changes being possible, this invention is not limited in any way with respect thereto. Moreover, it is to be understood that certain features of the invention can be employed without a corresponding use of other features thereof.

Accordingly, what is claimed as new is:

1. A capacitor including an insulator and terminal assembly, said capacitor having a top cover member with a plurality of openings therein, an insulator mounted on the top of said cover and having a plurality of cupped sections, each said section having an aperture in registration with one of said openings, legs integral with said insulator and extending therefrom intermediate the apertures in each said section, said legs engaging said cover to space said sections from said cover, a peripheral flange around each of said openings and extending toward said insulator to locate a bushing therein, sets of opposed shoulders located adjacent each of said apertures, a terminal having a body member seated between said each set of opposed shoulders, a stem extending downwardly from each said terminal through an aligned insulator aperture and cover opening and a bushing located around each said stem and in each said peripheral flange and seated against the top of each said terminal body, and a pressboard located beneath said cover and substantially abutting thereagainst to form a bottom for the opposite end of each of said bushings to seat against, and said legs permitting limited compression of said bushings between said sections and said pressboard while said terminals are sealably engaged with said cover through said insulator and bushings and locked into position to resist any twisting thereof.

2. An insulator and terminal assembly for a capacitor having an apertured cover, said assembly comprising an elongated insulator having cupped sections, each of said sections having an aperture generally in alignment with a cover opening, spacing means between said insulator and said cover and positioned intermediate adjacent sections, said spacing means keeping each aperture a given distance from its aligned opening, a bushing located in each aligned aperture and opening, each aperture having a slanted periphery limiting the protrusion of the bushing therethrough, each opening having stop means adjacent one side thereof to support the bushing substantially coextensive with the lower surface of said cover, said bushing having a normal length greater than the limits between said slanted periphery and said stop means, and terminals each having a stem portion located within each said bushing and a body portion seated on said insulator, said spacing means limiting compression on said bushing and said terminal is sealed to said cover to prevent seepage of insulatng fluid from said capacitor through said apertures.

3. The combination comprising a capacitor and an insulator and terminal assembly therefor, said capacitor including a cover, a pressboard located directly beneath and substantially flush with said cover, coaxial openings and apertures in said cover and said pressboard respectively, an elongated insulator having a plurality of cupped sections, each of said sections having an aperture coaxially aligned with an opening in said cover, a terminal seated in each of said sections and having a stem portion extending through said section's aperture and through the cooperating opening of the cover and the cooperating aperture of the pressboard, a bushing surrounding each said stem portion and located in its respective insulator aperture and said cover opening, each cover opening being of a size to receive said bushing while each said pressboard aperture being of a size adapted to receive said stem portion alone, said bushing resting at its opposed ends against said terminal head and said pressboard respectively, spacing members between said insulator and said cover member positioned intermediate adjacent section apertures, and a flange across the bottom of said stem of a size larger than a pressboard aperture thus securing the pressboard against said cover member and providing electric contact with a capacitive means within said capacitor below said cover, the insulator and bushing being located at least coextensive with the bottom surface of said cover member or thereabove, and said spacing members permitting limited compression of said bushings between said terminal heads and said pressboard while said insulating and terminal assembly generally does not interfere with the inner area of the capacitor.

4. An insulator and terminal assembly for a capacitor having a cover with openings provided therethrough, said assembly comprising, an elongated rigid insulating member having a body portion including cupped sections provided in the portion thereof which faces away from said capacitor cover, an aperture opening into and extending through each of the cupped sections of said insulator member, the apertures provided through said insulator member being aligned with the openings provided through said capacitor cover, rigid spacing means extending from the body portion of said insulator member to the cover of said capacitor and positioned intermediate the apertures provided through said insulator member, said spacing means positioning said insulator member a predetermined distance from said capacitor cover, a resilient bushing positioned in each aperture provided through said insulator member and extending from the surface of the cupped sections of said insulator member to a surface of said capacitor cover, each aperture provided through said insulator member having a slanted peripheral surface which applies a compressive force against the said busing positioned therein, each opening provided through said cover having stop means adjacent thereto to support an end of each of said bushing substantially coexistensive with a surface of said cover, said bushings being expanded in the space between said insulator member and said cover, and a plurality of terminals each having a surface overlapping the apertures opening into the cupped sections of said insulator member to apply to compressive force against said bushings, a stem portion forming a part of each of said terminals, each stem portion of said terminals positioned within one of said bushings, and the comprehensive forces applied to said bushings forming a liquid tight seal about the stem portions of said terminals and a surface of said capacitor cover.

5. An insulator and terminal assembly for a capacitor having a cover with openings provided therethrough, said assembly comprising, an elongated rigid insulating member having a body portion including cupped sections provided in the portion thereof which faces away from said capacitor cover, an aperture opening into and extending through each of the cupped sections of said insulator member, the apertures provided through said insulator member being aligned with the openings provided through said capacitor cover, rigid spacing means extending from the body portion of said insulator member to the cover of said capacitor and positioned intermediate the apertures provided through said insulator member, said spacing means positioning said insulator member a predetermined distance from said capacitor cover, a peripheral flange portion around each of said cover openings and extending toward said insulator member, a resilient bushing positioned in each flange cover opening and extending from a surface of the capacitor cover to the surface of the cupped sections of said insulator member, each aperture provided through said insulator member having a slanted peripheral surface which applies a compressive force against the said bushing positioned therein, a pressboard beneath and substantially flush with said capacitor cover, said pressboard having openings therein smaller than said cover openings to provide stop means to support an end of each of said bushings substantially coextensive with a surface of said capacitor cover, and a plurality of terminals each having a surface overlapping the apertures opening into the cupped sections of said insulator member to apply a compressive force against said bushings, a stem portion forming a part of each of said terminals, each stem portion of said terminals positioned within one of said bushings, and the compressive forces applied to said bushings forming a liquid tight seal about the stem portions of said terminals and a surface of said capacitor cover.

6. The insulator and terminal assembly as specified in claim 5, wherein each of said cupped sections provided with sets of opposed shoulders adjacent each of said apertures abutting against said terminals to prevent rotation thereof.

References Cited in the file of this patent

UNITED STATES PATENTS

| | | |
|---|---|---|
| 2,684,401 | Roeser | July 20, 1954 |
| 2,904,622 | Beronio | Sept. 15, 1959 |
| 3,015,687 | Ruscito | Jan. 2, 1962 |
| 3,023,268 | Preiser et al. | Feb. 27, 1962 |

FOREIGN PATENTS

| | | |
|---|---|---|
| 737,205 | Great Britain | Sept. 21, 1955 |

OTHER REFERENCES

"A Few Facts About Motor Capacitor Terminals," published by Sprague Company, in Electro-Technology, March 1961, vol. 67, No. 3, page 167.

"Capacitors-Silicone-Sealed for Life," published in the General Electric Review, June 1950.